US008250542B1

(12) United States Patent
Ball

(10) Patent No.: US 8,250,542 B1
(45) Date of Patent: Aug. 21, 2012

(54) METHOD AND APPARATUS FOR PERFORMING TRACE DATA COMPRESSION

(75) Inventor: James Loran Ball, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 1234 days.

(21) Appl. No.: 11/324,499

(22) Filed: Jan. 3, 2006

(51) Int. Cl.
*G06F 9/44* (2006.01)
(52) U.S. Cl. .......................... 717/128; 717/124; 717/127
(58) Field of Classification Search .......................... None
See application file for complete search history.

(56) References Cited

U.S. PATENT DOCUMENTS

| 6,918,065 | B1 | 7/2005 | Edwards et al. |
| 7,330,809 | B2 | 2/2008 | Tabe |
| 7,496,902 | B2 | 2/2009 | Levine et al. |
| 2003/0101436 | A1* | 5/2003 | Kobrosly et al. ............. 717/128 |
| 2004/0215934 | A1* | 10/2004 | Yoaz et al. .................... 712/202 |
| 2005/0268177 | A1 | 12/2005 | John |
| 2005/0289400 | A1 | 12/2005 | Kimura |
| 2006/0101251 | A1 | 5/2006 | Nguyen et al. |
| 2006/0107123 | A1 | 5/2006 | Okamoto et al. |
| 2006/0150023 | A1 | 7/2006 | Hasebe et al. |

OTHER PUBLICATIONS

Lindahl, "Analyzing Real-Time Systems with Hardware Trace", Mar. 2005, CMP Media, C/C++ User Journal.*
U.S. Appl. No. 11/324,570, filed Jan. 3, 2006, In re Application James Loran Ball.
ARM Limited, "Embedded Trace Macrocell Specification", 1999.

* cited by examiner

*Primary Examiner* — Lewis A Bullock, Jr.
*Assistant Examiner* — Mark Gooray
(74) *Attorney, Agent, or Firm* — L. Cho

(57) ABSTRACT

A method for compressing trace data includes maintaining a record of register values known to a debugger unit. A data packet is generated that includes a value in response to determining that the debugger unit is unable to determine the value from the register values known to the debugger unit.

27 Claims, 15 Drawing Sheets

| CODE | MNEMONIC | DESCRIPTION |
|---|---|---|
| 00 | NIE | NO INSTRUCTION EXECUTED |
| 01 | SEQ | INSTRUCTION EXECUTED (NEXT PC IS SEQUENTIAL) |
| 10 | BRA | INSTRUCTION EXECUTED (NEXT PC IS BRANCH TARGET) |
| 11 | PKT | PACKET GENERATED |

FIG. 3

| 33 | 32 | 31 | 30 | 29:0 |
|---|---|---|---|---|
| 1 | 0 | 0 | 0 | Target PC[29:0] |

FIG. 10B

| 33 | 32 | 31 | 30 | 29:0 |
|---|---|---|---|---|
| 1 | 0 | 0 | 1 | PC[29:0] |

FIG. 10C

| PCB | Instruction | Status | 33 | 32 | 31 | 30 | 29:0 | Description |
|---|---|---|---|---|---|---|---|---|
| 0x100 | xor | PKT | 0 | 0 | 1 | 1 | 0x100/4 | SYNC – Trigger and gap |
| 0x104 | add | SEQ | | | | | | |
| 0x108 | cond branch taken to 0x200 | BRA | | | | | | |
| 0x200 | cond branch not-taken | SEQ | | | | | | |
| 0x204 | uncond branch to 0x300 | BRA | | | | | | |
| 0x300 | or | PKT | 0 | 0 | 0 | 0 | 0x300/4 | SYNC - Periodic |
| 0x304 | load | SEQ | | | | | | |
| 0x308 | cond branch taken to 0x400 | PKT | 0 | 1 | 1 | 0 | 0x308/4 | SYNC – Trigger on taken branch instruction |
| 0x30c | indirect jump to 0x400 | PKT | 1 | 0 | 0 | 0 | 0x400/4 | IJMP |
| 0x400 | mul | PKT | 1 | 0 | 0 | 1 | 0x400/4 | INTR |

FIG. 11

| PCB | Instruction | Status | 34 | 33 | 32 | 31 | 30 | 29:0 | Description |
|---|---|---|---|---|---|---|---|---|---|
| 0x100 | add r1, r2 -> r3 | SEQ | 0 | 0 | 0 | 0 | 1 | 0x100/4 | SYNC - Gap |
| 0x104 | cond branch taken | BRA | | | | | | | |
| 0x200 | or r3, r4 -> r5 | PKT | 0 | 1 | 1 | r5 value | | | DATA REG |
| 0x204 | add r5, r5 -> r6 | SEQ | | | | | | | |
| 0x208 | load [r7] -> r8 | PKT | 0 | 1 | 1 | r8 value | | | DATA REG |
| | | | 1 | 1 | 1 | r7 value | | | DATA ADDR |
| 0x20c | load [r5] -> r9 | PKT | 0 | 1 | 1 | r9 value | | | DATA REG |
| 0x210 | store r11 -> [r10] | PKT | 0 | 1 | 1 | r11 value | | | DATA REG |
| | | | 1 | 1 | 1 | r10 value | | | DATA ADDR |
| 0x214 | store r5 -> [r12] | PKT | 1 | 1 | 1 | r12 value | | | DATA ADDR |
| 0x218 | store r6 -> [r11] | SEQ | | | | | | | |
| 0x21c | indirect jump -> [r13] | IJMP | 0 | 1 | 0 | 0 | 1 | 0x300/4 | |
| 0x300 | indirect jump -> [r12] | SEQ | | | | | | | |

FIG. 13

METHOD AND APPARATUS FOR PERFORMING TRACE DATA COMPRESSION

TECHNICAL FIELD

The present invention relates to tools used for debugging software executed on a processor. More specifically, the present invention relates to a method and apparatus for reducing the compression ratio of trace data from a processor.

BACKGROUND

Hardware trace data provides a log of instructions executed by a processor. Trace data may also include information about data that is read from and written to memory as well as information about when context switches and interrupts occur. This allows software engineers to examine interactions between tasks and interrupts in a system which is particularly helpful for debugging software executed in embedded systems where utilizing normal code instrumentation may be difficult. Trace data does not require modifying aspects of a program to collect data. Thus, systems with tight timing margins need not be affected by the addition of code in order to generate the trace data.

Collecting a log of instructions and/or data values may require a large amount of storage space. In the past, some systems utilized trace capture boxes. Trace capture boxes provide a high bandwidth, large volume storage medium for storing trace data off chip and off board memory. Trace capture boxes, however, were relatively expensive and proved to be a costly solution that was undesirable for system designers.

Other approaches in the past included attempt to compress the trace data in order to reduce the amount of storage space required for on chip and on board memories and also to reduce bandwidth requirements. The traditional compression techniques used, however, provided only marginal improvements.

Thus, what is needed is an efficient and effective method and apparatus for performing trace data compression.

SUMMARY

According to a first embodiment of the present invention, data trace compression is performed by recording a status of instruction execution of a processor with a 2-bit value. A packet may be recorded to augment the 2-bit value. The packet may include information associated with an instruction executed by the processor. According to a second embodiment of the present invention, a first number of bits are designated to either identify a direction of instruction execution in response to an execution of commonly executed instructions or indicate that a less frequently executed instruction has been executed. A packet having a second number of bits is generated to identify the direction of instruction execution for the less frequently executed instruction. A debugging unit may reconstruct the processor's execution stream from the compressed data trace.

BRIEF DESCRIPTION OF THE DRAWINGS

The features and advantages of the present invention are illustrated by way of example and are by no means intended to limit the scope of the present invention to the particular embodiments shown.

FIG. 3 illustrates representations of states of instruction execution according to an embodiment of the present invention.

FIG. 10B illustrates an exemplary IJMP packet according to an embodiment of the present invention.

FIG. 10C illustrates an exemplary INTR packet according to an embodiment of the present invention.

FIG. 11 illustrates an example of trace compression according to a first embodiment of the present invention.

FIG. 13 illustrates an example of trace compression according to a second embodiment of the present invention.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
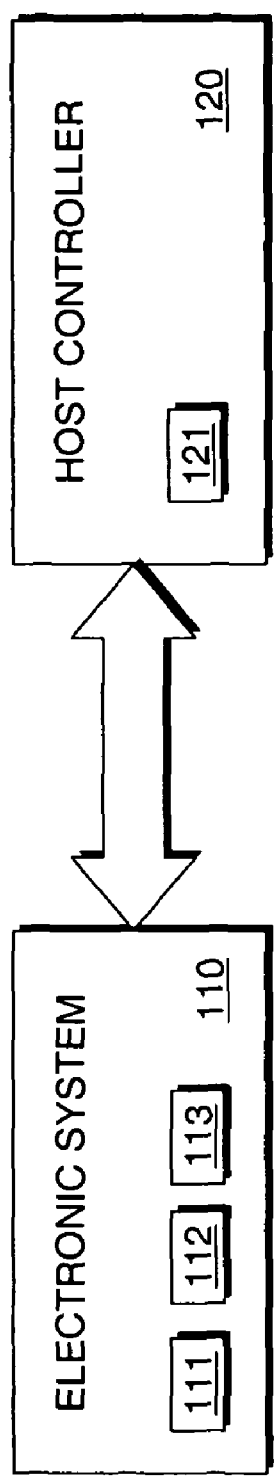
FIG. 1 illustrates an electronic system under test according to an embodiment of the present invention.

FIG. 1 illustrates an electronic system 110 under test according to an embodiment of the present invention. The electronic system includes a processor 111. The processor 111 may be a complex instruction set computer microprocessor, a reduced instruction set computing microprocessor, a very long instruction word microprocessor, a processor implementing a combination of instruction sets, or other processor device. The processor 111 may execute a program with instructions and generate data values.

The electronic system 110 includes a trace compression unit 112. The trace compression unit 112 interfaces with the processor 111 and compresses trace data generated by the processor 111. The trace data may include the instructions executed by the processor 111 and/or data values generated by the processor 111. According to a first embodiment of the trace compression unit 112, trace data may be compressed by representing a status of instruction execution of a processor with a 2-bit value. An instruction packet may be generated to include information associated with an instruction executed by the processor upon determining that the instruction belongs to a group of identified instructions. According to a second embodiment of the trace compression unit 112, trace data may be compressed by only transmitting to a debugger unit values required for reconstructing trace data. In this embodiment, the trace compression unit 112 maintains a record of register values known to a debugger unit. The trace compression unit 112 generates a packet that includes a value required for executing the instruction in response to determining that the debugger unit is unable to determine the value from the register values known to the debugger unit.

The electronic system 110 includes a trace memory 113. The trace memory 113 may be used to store compressed trace data generated by the trace compression unit 112. The trace memory 113 may reside on the electronic system 110 either on the same chip or board as the trace compression unit 112. Alternatively, the trace memory 113 may reside outside the electronic system 110.

A host computer 120 is coupled to the electronic system 110. The host computer 120 includes a processor 121 that may execute a program to implement a debugger unit for testing the program being executed on the electronic system 110. The debugger unit may include a simulator that mimics the behavior or the processor 111 on the electronic system 110, and a trace decompressor that reconstructs the trace data compressed by the trace compression unit 112.

According to an embodiment of the present invention, the electronic system 110 may be implemented by a field programmable gate array (FPGA). The FPGA includes a plurality of programmable resources to implement the processor 111, trace compression unit 112, and trace memory 113.

Figure 2:
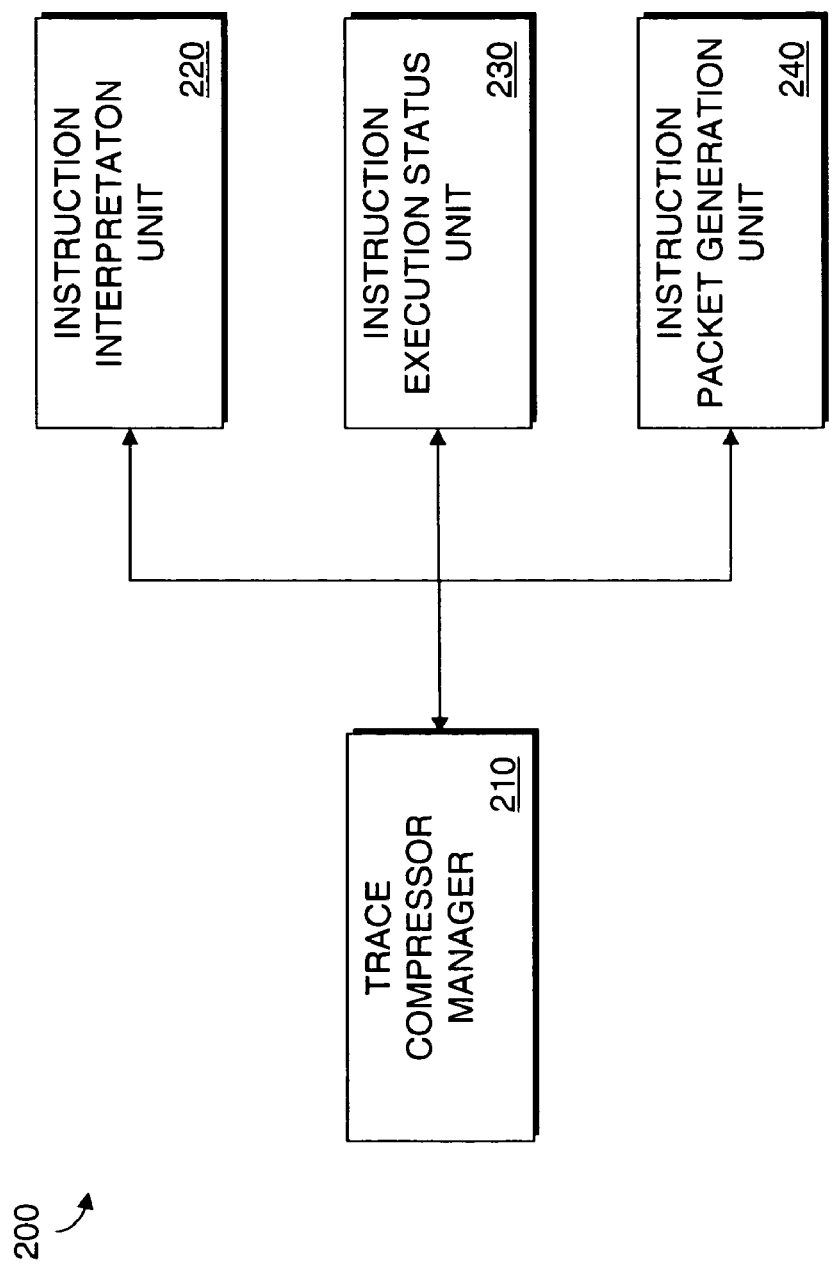
FIG. 2 is a first embodiment of a trace compression unit according to an embodiment of the present invention.

FIG. 2 illustrates a first embodiment of a trace compression unit 200 according to an embodiment of the present invention. The trace compression unit 200 may be used to implement the trace compression unit 112 shown in FIG. 1. The trace compression unit 200 includes a trace compression manager 210. The trace compression manager 210 interfaces with and transmits data between components in the trace compression unit 200. The trace compression manager 210 also interfaces with a processor, such as processor 111 (shown in FIG. 1), to retrieve instructions in a program executed by the processor 111. The trace compression manager 210 may attempt to retrieve instructions executed by the processor every clock cycle. Alternatively, the trace compression manager 210 may retrieve instructions executed by the processor only after an instruction is executed.

The trace compression unit 200 includes an instruction interpretation unit 220. The instruction interpretation unit 220 examines instructions received by the processor and determines whether the instruction belongs to a group of identified instructions which requires additional data to describe the status of instruction execution of the processor. According to an embodiment of the trace compression unit 200, instructions that belong in the identified group may include instructions that result in interrupts, indirect jumps, or a need to synchronize a program counter.

The trace compression unit 200 includes an instruction execution status unit 230. The instruction execution status unit 230 generates a value to represent the instruction execution status of the processor in response to the examination performed by the instruction interpretation unit 220. According to an embodiment of the present invention, 2 bits may be used to represent the instruction execution status of the processor. In this embodiment, up to four states may be represented for various statuses of instruction execution.

FIG. 3 illustrates representations of states of instruction execution according to an embodiment of the present invention. A first state may be represented with code 00. This state indicates that no instruction has been executed by the processor. It should be appreciated that this state would only be used if the trace compression manager 210 is configured to retrieve instructions from the processor every clock cycle. A second state may be represented with code 01. This state indicates that an instruction has been executed and that the program counter is sequential. A third state may be represented with code 10. This state indicates that an instruction has been executed and that the program counter has been set to the branch target of the instruction. According to an embodiment of the present invention, a branch instruction specifies a target address as a constant offset in the instruction and an indirect jump instruction specifies the target address as a register number and the register contains the target address. A fourth state may be represented with code 11. This state indicates that an instruction has been executed and that a packet has been generated. It should be appreciated that other numbers of bits and states of instruction execution may be implemented.

Referring back to FIG. 2, the trace compression unit 200 includes an instruction packet generation unit 240. The instruction packet generation unit 240 generates an instruction packet that may be transmitted with a instruction execution status to provide further information about the instruction execution status of the processor such as its program counter. According to an embodiment of the trace compression unit 200, when an instruction that results in an interrupt is executed, the instruction packet generation unit 240 may generate an instruction packet that includes the program counter of the instruction that was interrupted. When an instruction that results in an indirect jump is executed, the instruction packet generation unit 240 generates an instruction packet that includes the target program counter of the jump. The instruction packet generation unit 240 also generates an instruction packet with the program counter when synchronization is desired. Synchronization may be desired, for example, when a conditional branch instruction is executed, a trigger has occurred, when there is a gap in the instruction trace, and/or to allow trace segments to be independent.

Figure 4:
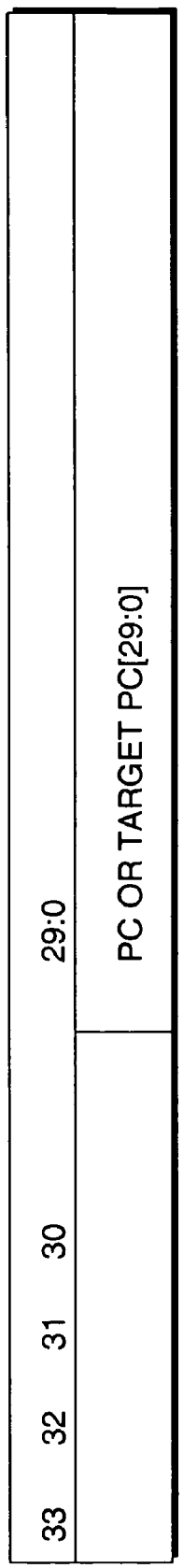
FIG. 4 illustrates an instruction packet according to an embodiment of the present invention.

FIG. 4 illustrates an instruction packet according to an embodiment of the present invention. In this embodiment, the instruction packet includes 34 bits. The instruction packet may utilize a first plurality bits for an identifier field to indicate a reason why the instruction packet was generated or to identify its corresponding instruction. That instruction packet may utilize a second plurality of bits for its payload and store a program counter value in the payload. It should be appreciated that the instruction packet may be configured to be any appropriate size.

The status of instruction execution generated by the status instruction execution status unit 230 and the instruction packet when generated by the instruction packet generation unit 240 may be utilized as compressed trace data. A first processor, such as processor 121 (shown in FIG. 1), running a simulation of a program executed on a second processor, such as processor 111 (shown in FIG. 2), may determine the instructions being executed on the second processor from the compressed trace data.

Figure 5:
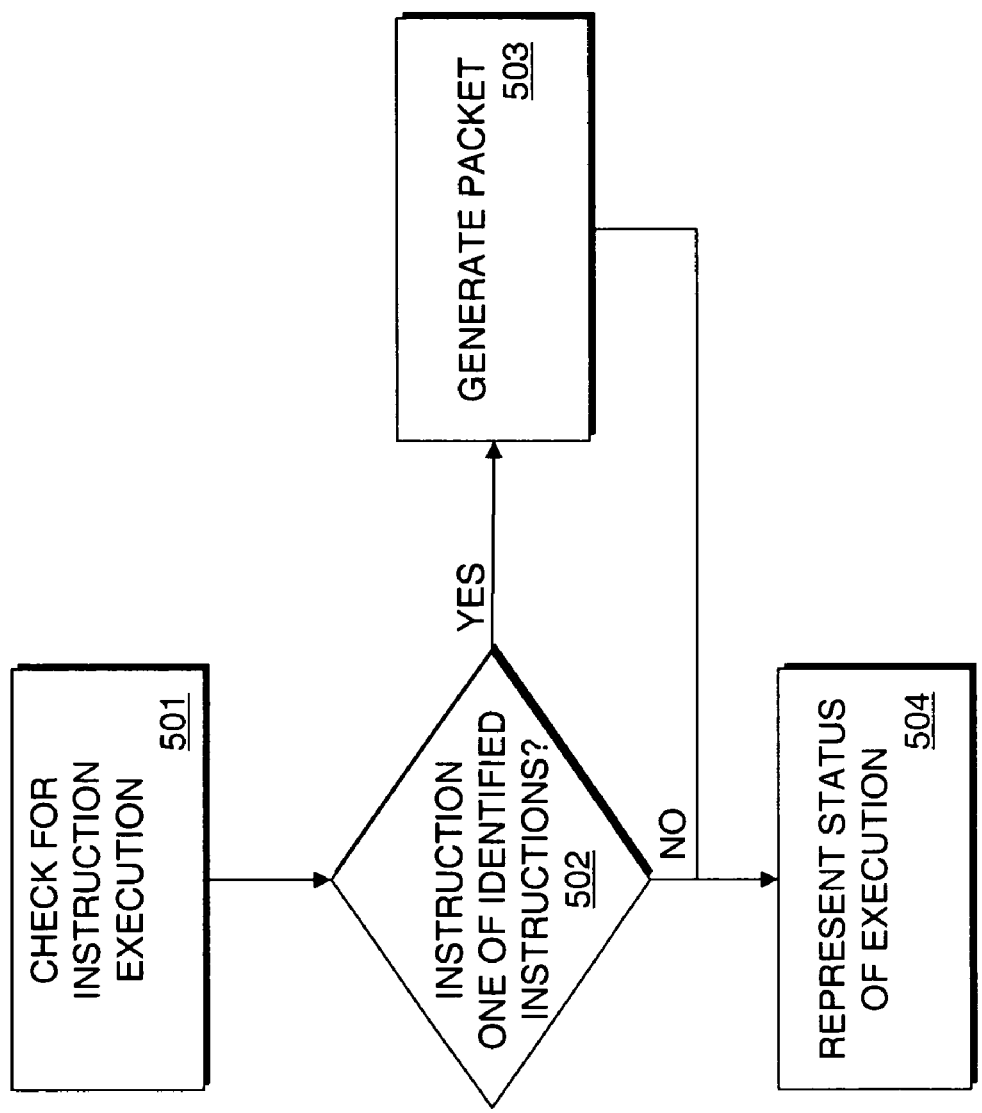
FIG. 5 is a flow chart illustrating a method for compressing trace data according to a first embodiment of the present invention.

FIG. 5 is a flow chart that illustrates a method for compressing trace data according to an embodiment of the present invention. At 501, it is determined whether an instruction has been executed by a processor. According to an embodiment of the present invention, information regarding whether an instruction has been executed by the processor along with information about the instruction may be reported every clock cycle. Alternatively, information about the instruction may be reported only after an instruction has been executed.

At 502, it is determined whether an instruction executed is one of the identified instructions in a group. According to an embodiment of the present invention, the group of identified instructions may include instructions that require program counters to be reported to indicate the direction of instruction execution or to indicate from what direction instruction execution had come from. These instructions may include conditional branch instructions, indirect jump instructions or interrupted instructions. The group of identified instructions may also include instructions associated with satisfying a trigger or instructions executed after a gap in the instruction trace. If the instruction executed is one of the identified instructions in the group, control proceeds to 503. If the instruction executed is not one of the identified instructions in the group, control proceeds to 504.

At 503, an instruction packet is generated. According to an embodiment of the present invention, for instructions that result in an interrupt, the instruction packet may include the program counter of the instruction prompting the interrupt. For instructions that result in an indirect jump, the instruction packet may include the target program counter of the jump. For instructions associated with synchronization, such as when a conditional branch instruction is executed, a trigger has occurred, and/or when there is a gap in the instruction trace, the instruction packet may include a program counter.

At 504, the status of instruction execution is represented. According to an embodiment of the present invention, the status of instruction execution is represented using a first number of bits. The first number of bits either identify a direction of instruction execution in response to an execution of commonly executed instructions or indicate that a less frequently executed instruction has been executed and that a packet having a second number of bits is generated to identify the direction of instruction execution for the less frequently executed instruction.

Figure 6:
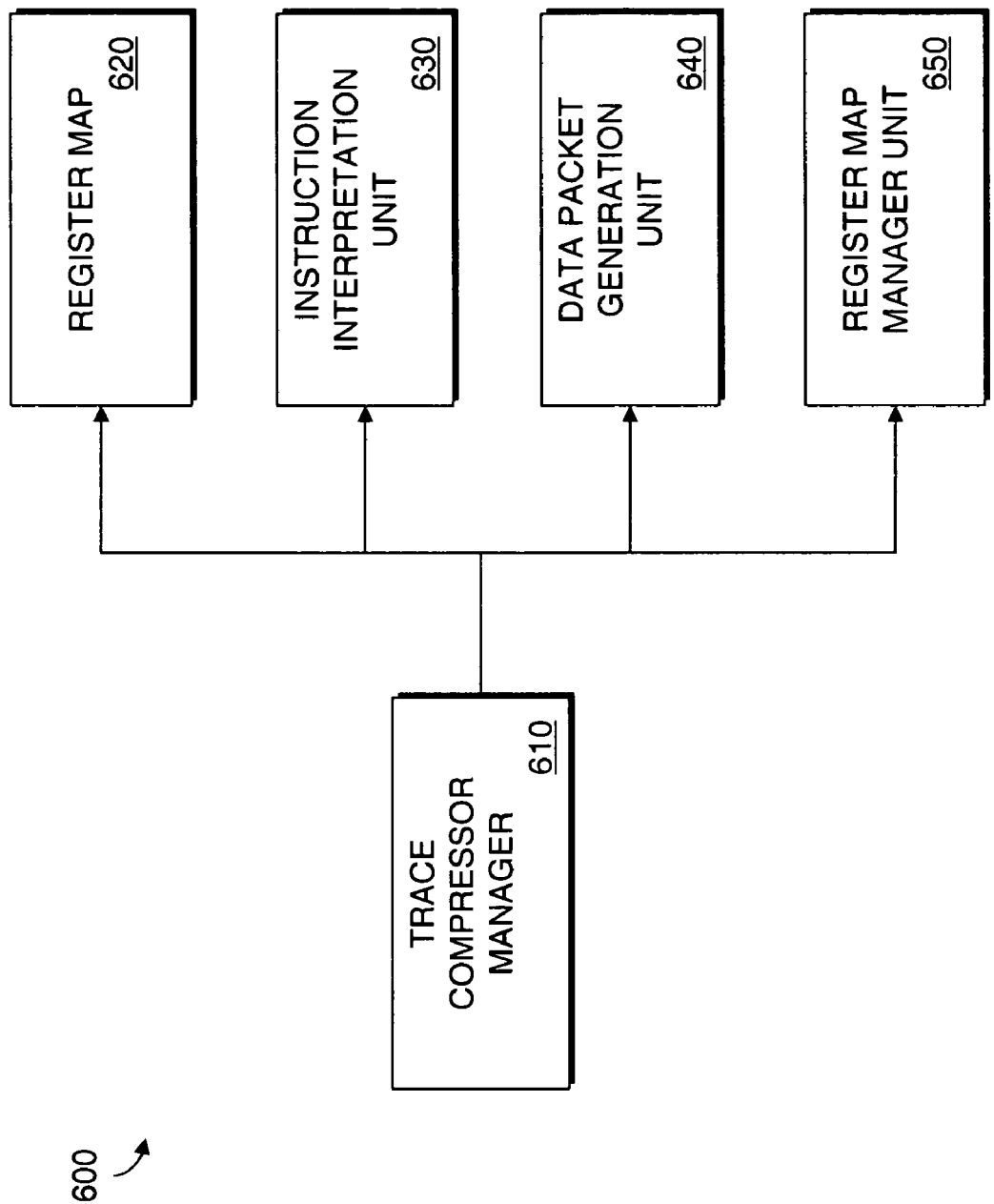
FIG. 6 illustrates a second embodiment of a trace compression unit according to an embodiment of the present invention.

FIG. 6 illustrates a second embodiment of a trace compression unit 600 according to an embodiment of the present invention. The trace compression unit 600 may be used to implement the trace compression unit 112 shown in FIG. 1. The trace compression unit 600 includes a trace compression manager 610. The trace compression manager 610 interfaces with and transmits data between components in the trace compression unit 600. The trace compression manager 610 also interfaces with a processor, such as processor 111 (shown in FIG. 1), to retrieve instructions in a program executed by the processor 111.

The trace compression unit 600 includes a register map 620. The register map 620 maintains a record of register values known to a debugger unit. The register values may include register values of registers associated with the processor that may be used for data or addresses. According to an embodiment of the trace compression unit 600, the register map 610 may be implemented with a register. In this embodiment, each bit in the registers represents a register associated with the processor. A bit may be set to a first state (low) to indicate that the debugger unit does not know the register value in the corresponding register. A bit may be set to a second state (high) to indicate that the debugger unit does know the register in the corresponding register. Upon initialization of the processor or after a gap in the instruction trace, all the bits in the register may be set to indicate that the register values are unknown to the debugger.

The trace compression unit 600 includes an instruction interpretation unit 630. The instruction interpretation unit 630 examines an instruction received by the processor and determines whether the debugger unit is able to determine a value for the instruction, such as an address or data, from the register values known to the debugger unit.

The trace compression unit 600 includes a data packet generation unit 640. The data packet generation unit 640 generates one or more data packets in response to the instruction interpretation unit 630 determining that the debugger unit is unable to determine a value for an instruction with register values known to the debugger unit. The data packets may include appropriate address or data values. The debugger unit may run the data packet through a model of the processor or a simulator to determine register values such as load/store addresses and store data.

According to an embodiment of the trace compression unit 600, when a load instruction is executed, a first data packet is generated with the data that is loaded. A second data packet may be generated with an address for memory if the debugger unit is not able to determine it. For a store instruction, a first data packet with data that is stored and/or a second data packet with an address for memory are generated if the debugger unit is not able to determine the values. For flush and init instructions, a data packet with an address for memory is generated if the debugger unit is not able to determine the value. For wrctl/rdctl instructions, a data packet with a control register value is generated if the debugger unit is unable to determine the value. It should be appreciated that all other instructions that write a register file may prompt the generation of a data packet with data that is to be written if the debugger unit is unable to determine the value written to the register file.

Figure 7:
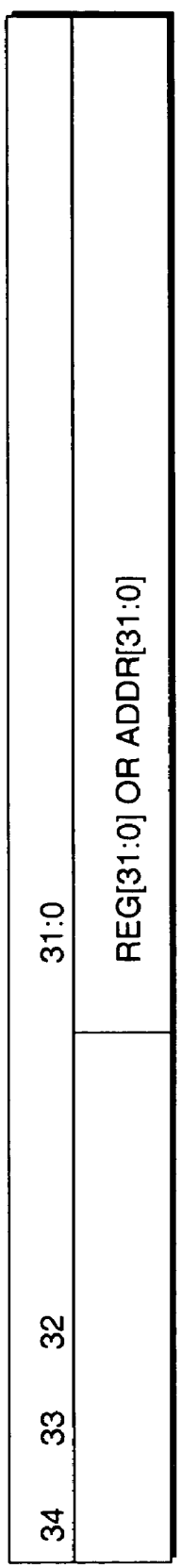
FIG. 7 illustrates a data packet according to an embodiment of the present invention.

FIG. 7 illustrates an instruction packet according to an embodiment of the present invention. In this embodiment, the packet includes 35 bits. The packet may utilize a first plurality bits for an identifier field to identify a data type stored in the data packet. That data packet may utilize a second plurality of bits for its payload and store an address, data, or register value in the payload. It should be appreciated that the instruction packet may be configured to be any appropriate size.

Referring back to FIG. 6, the trace compression unit 600 includes a register map manager unit 650. The register map manager unit 650 updates the register map 620 in response to instructions executed by the processor on the electronic device and simulator on the host computer. These instructions may include register write instructions. The register map manager 650 also updates the register map 620 in response to data packets generated for transmission to the debugger unit in the host computer.

Although the trace compression units in FIGS. 2 and 6 are shown separately, it should be appreciated that the components illustrated in the figures could be implemented together in a single trace compression unit such that functionalties of both embodiments may be practiced together. In this combined embodiment, one or more of the illustrated components may be combined to facilitate performing of the functionalties described.

Figure 8:
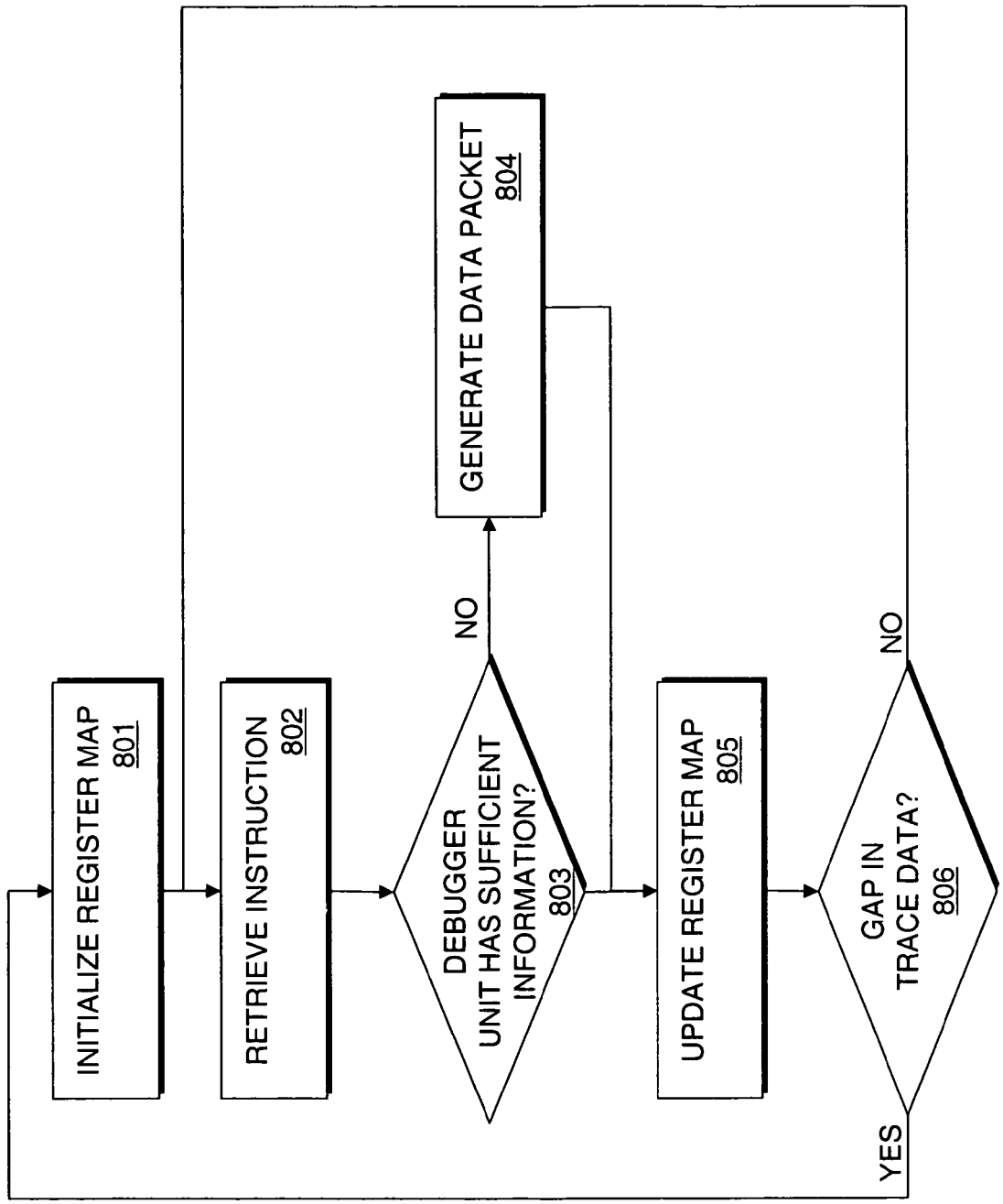
FIG. 8 is a flow chart illustrating a method for compressing trace data according to a second embodiment of the present invention.

FIG. 8 is a flow chart illustrating compressing trace data according to a second embodiment of the present invention. At 801, a register map is initialized. A register map that records registers with register values that are known to a debugger unit is initialized to indicate that the debugger unit does not know any of the register values. According to an embodiment of the present invention, the register map is initialized whenever a processor or debugger unit is starting up. The register map may also be initialized when there is a gap in trace data.

At 802, an instruction that has been executed by the processor is retrieved.

At 803, it is determined whether the debugger unit is able to execute the instruction using the register values known to it. According to an embodiment of the present invention, registers having register values required for executing the instruction are first identified. Afterwards, the register map is checked to determine whether the debugger unit knows the register values in the identified registers. If the debugger unit does not know the register values required for executing the instruction, control proceeds to 804. If the debugger unit knows the register values required for executing the instruction, control proceeds to 805.

At 804, one or more data packets are generated that include one or more register values required for the debugger unit to execute the instruction. The register values may include addresses or data. The data packets may be stored in a trace memory to be transmitted to the debugger unit.

At 805, the register map is updated to reflect new register values that the debugger unit may become aware of. The register map may be updated in response to receiving one or more data packets or in response to a new instruction executed by the debugger unit.

At 806, it is determined whether there is a gap in the trace data. If there is a gap in the trace data, control returns to 801. If there is no gap in the trace data, control returns to 802.

FIGS. 5 and 8 are flow charts illustrating methods according to embodiments of the present invention. The techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Figure 9:
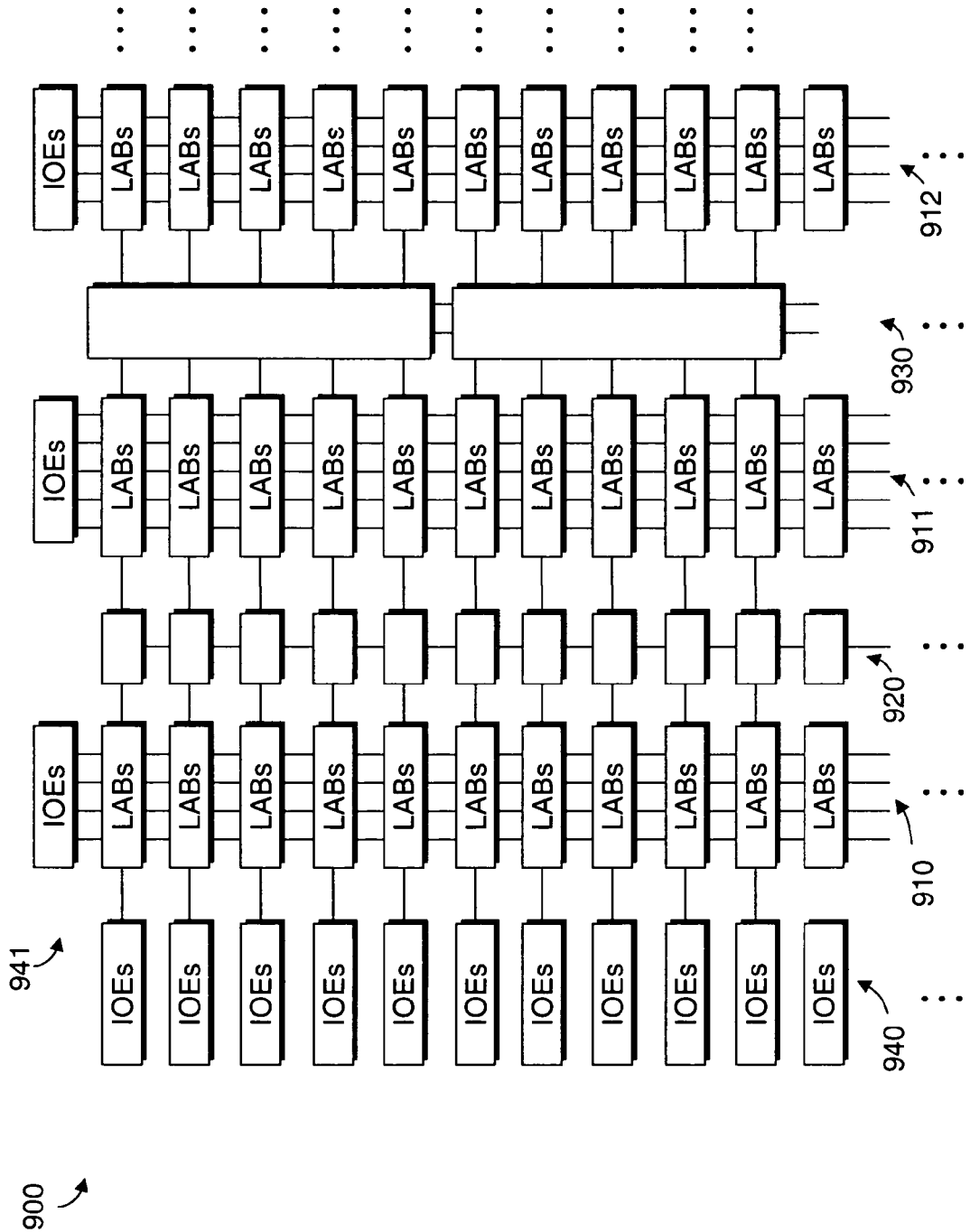
FIG. 9 illustrates an exemplary electronic device according to an embodiment of the present invention.

FIG. 9 illustrates an exemplary electronic device 900 according to an embodiment of the present invention. The electronic device 900 is an FPGA that may implement a processor, trace compression unit, and trace memory. According to one embodiment, the electronic device 900 is a chip having a hierarchical structure that may take advantage of locality properties of circuits formed therein. The lowest level of the hierarchy is a logic element (LE) (not shown). An LE is a small unit of logic providing efficient implementation of user logic functions. According to an embodiment of the electronic device 900, an LE may include a 4-input lookup table (LUT) with a configurable flip-flop.

The electronic device 900 includes a plurality of logic-array blocks (LABs). Each LAB is formed from 10 LEs, LE carry chains, LAB control signals, LUT chain, and register chain connection lines. LUT chain connections transfer the output of one LE's LUT to the adjacent LE for fast sequential LUT connections within the same LAB. Register chain connection lines transfer the output of one LE's register to the adjacent LE's register within a LAB. LABs are grouped into rows and columns across the electronic device 900. Column of LABs are shown as 910-912.

The electronic device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into one or more columns across the electronic device 900, as shown as 920, in between selected LABs or located individually or in pairs within the electronic device 900.

The electronic device 900 includes digital signal processing (DSP) blocks. The DSP blocks may be used to implement multipliers of various configurations with add or subtract features. The DSP blocks include shift registers, multipliers, adders, and accumulators. The DSP blocks may be grouped into one or more columns across the electronic device 900, as shown as 930.

The electronic device 900 includes a plurality of input/output elements (IOEs). Each IOE feeds an I/O pin (not shown) on the electronic device 900. The IOEs are located at the end of LAB rows and columns around the periphery of the electronic device 900, as shown as 940 and 941. Each IOE includes a bidirectional I/O buffer and a plurality of registers for registering input, output, and output-enable signals. When used with dedicated clocks, the registers provide performance and interface support with external memory devices, for example.

The electronic device 900 includes LAB local interconnect lines that transfer signals between LEs in the same LAB. The LAB local interconnect lines are driven by column and row interconnects and LE outputs within the same LAB. Neighboring LABs, memory blocks, IOEs, or DSP blocks may also drive the LAB local interconnect lines through direct link connections.

The electronic device 900 also includes a plurality of row and column interconnect lines that span fixed distances. Dedicated row and column interconnect lines route signals to and from LABs, DSP blocks, IOEs, and memory blocks within the same row and column.

FIG. 9 illustrates an exemplary embodiment of a electronic device implemented on an FPGA chip. It should be appreciated that the electronic device 900 may include a plurality of chips, such as that illustrated in FIG. 9, cascaded together. It should also be appreciated that the electronic device 900 may include FPGAs arranged in a manner different than that ones shown in FIG. 9 and include components other than those described in reference to FIG. 9. Thus, while an embodiment of the invention described herein may be utilized on the architecture described in FIG. 9, it should be appreciated that it may also be utilized on different architectures, such as those employed by Altera® Corporation in its APEX™, and Mercury™ family of chips and those employed by Xilinx®, Inc. in its Virtex™ and Virtex™ II line of chips.

Figure 10A:
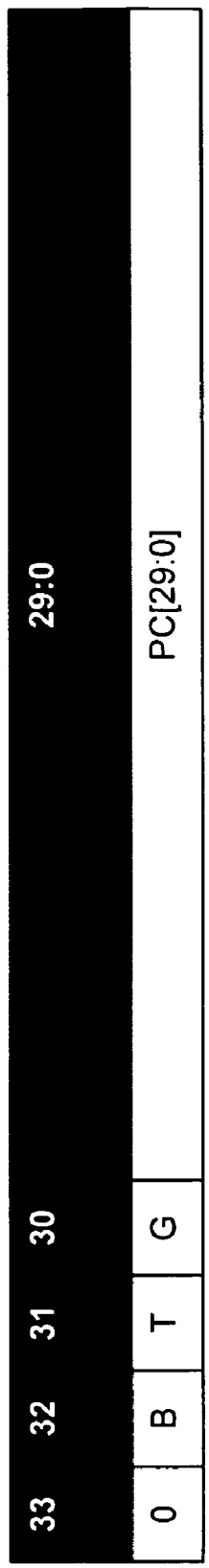
FIG. 10A illustrates an exemplary SYNC packet according to an embodiment of the present invention.

According to an embodiment of the present invention, an instruction packet includes a 4-bit packet type and a 30-bit payload. A SYNC packet is generated when a periodic instruction counter reaches a programmed value, when a trigger occurs, or when trace is enabled. A SYNC packet is shown in FIG. 10A. The SYNC packet is generated when an instruction is executed. The B bit (branch) is one if the instruction is a conditional branch that was taken. This information is normally provided by the pipeline status signals but they include the value PKT. The T bit (trigger) is one of the trigger has occurred and needs to be recorded. The G bit (gap) is one if there is a gap in the instruction trace before the SYNC packet. If the FIFO overflows, trace is temporarily disabled and a SYNC packet is generated when it is re-enabled.

If the SYNC packet is caused by the instruction counter or trigger, generation is delayed if another packet needs to be generated at the same time. If the SYNC packet is caused by trace being enabled, generation occurs even if another packet is generated at the same time.

Figure 10B:
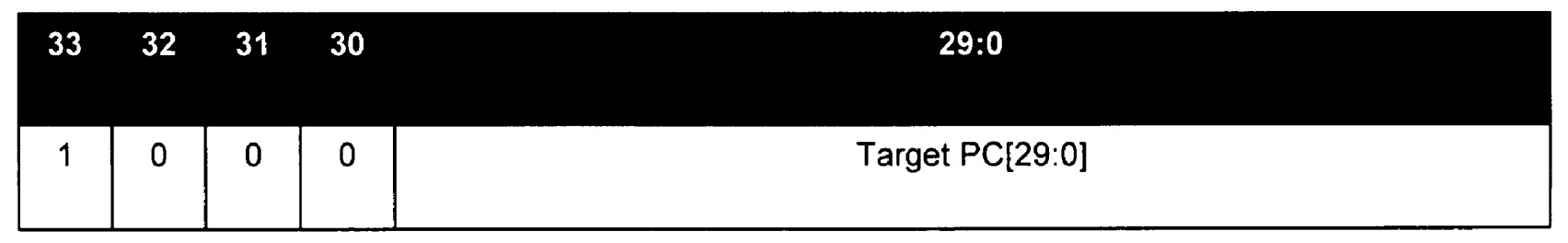

Indirect jump instructions are recorded with the IJMP packet shown in FIG. 10B. Interrupts are recorded with the packet shown in FIG. 10C. The INTR packet records the program counter of the interrupt instruction.

FIG. 11 illustrates an example of the pipeline status and packets that are generated for an instruction sequence when timing trace is not active. The PCB column lists the byte address of the instruction. The Instruction column lists the name of the instruction. The Status column lists the two bit pipeline status. The columns for bits 33:0 lists the value of a packet. If the column is empty, no packet is generated. The column for bits 29:0 lists an instruction word address which is the instruction byte address divided by four.

At PCB=0x100, a trigger enables instruction trace on an xor instruction. The pipeline status is set to PKT and a SYNC packet is generated. The trigger and gap bits set because the trace is just starting. At PCB=0x104, an add instruction is sequential so the pipeline status is set to SEQ. At PCB=0x108, a conditional branch to 0x200 is taken so the pipeline status is set to BRA. At PCB=0x200, a conditional branch is not taken so the pipeline status is set to SEQ. At PCB=0x204, an unconditional branch to 0x300 is taken so the pipeline status is set to BRA. At PCB=0x300, a periodic SYNC occurs on an or instruction. At PCB=0x304, a load instruction just sets the pipeline status to SEQ. At PCB=0x308, a SYNC caused by a trigger occurs on a taken conditional branch instruction. At PCB=0x30c, an indirect jump instruction generates an IJMP packet. At PCB=0x400, a mul instruction is interrupted so an INTR packet is generated.

Figure 12:
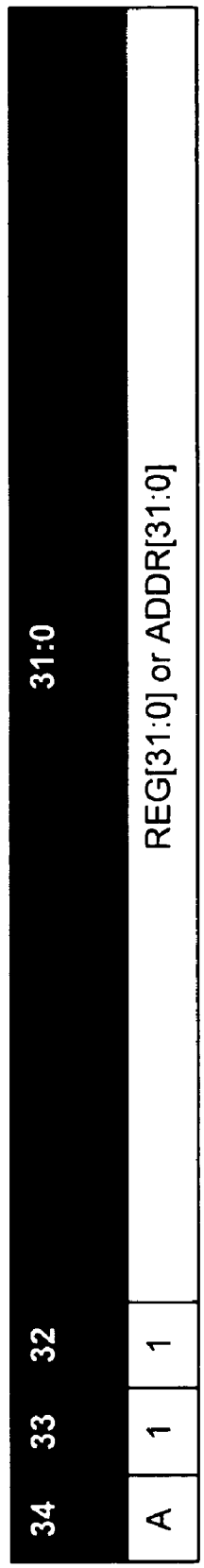
FIG. 12 illustrates an exemplary embodiment of the data packet shown in FIG. 7 according to an embodiment of the present invention.

FIG. 12 illustrates an exemplary data packet according to an embodiment of the present invention. The data packet includes a 3-bit packet type and a 32-bit payload. If data trace is enabled, one or two data packets are recorded at the same time. A register field (REG) in the payload stores a register value. Alternatively, an address field (ADDR) in the payload stores a memory address and is only used by instructions with an associated memory address (load, store, flush, init). If an instruction generates two data packets, the first data packet includes the register value and the second data packet includes the address value. The A bit (address) is one when the payload is used for storing an address and zero when the payload is used for storing a register.

According to one embodiment, the data packet shown in FIG. 12 may be used as follows. Load instructions always record the load data in REG. Load instructions record the memory address in ADDR if a decompressor is unable to compute the value. Store instructions record the store data in REG and/or the memory address in ADDR if the decompressor is unable to compute the values. Flush/init instructions record the memory address in ADDR if the decompressor is unable to compute the value. Wrctl/rdctl instructions record the control register value in REG if the decompressor is unable to compute the value. All other instructions that write the register file record that value in REG if the decompressor is unable to compute the value.

FIG. 13 illustrates an example of the pipeline status and packets that are generated for an instruction sequence when timing trace is not active, but when data trace is active. The PCB column lists the byte address of the instruction. The Instruction column lists the name of the instructions. The Status column lists the two bit pipeline status. Columns for bits 34:0 represent the value of a packet. If the entry is empty, no packet is generated. For instruction trace packets, bits 29:0 include an instruction word address which is the instruction byte address divided by four. For data trace packets, bits 31:0 include a 32-bit register value or a 32-bit byte address. At PCB=0x100 a SYNC packet is generated due to a gap. The decoder marks all 31 registers as having unknown values. No DATA REG packet is generated to record the value of r3 because a SYNC packet is also generated.

At PCB=0x104, a taken conditional branch is recorded with a BRA pipeline status (same as instruction tracing). At PCB=0x200, an or instruction writes register r5. The decoder does not know the value of r5 since it does not know the value of r3 and r4. Thus, a DATA REG packet is generated to record the value of r5. At PCB=0x204, an add instruction writes register r6. The decoder computes the value of r6 since it knows the value of r5. No packet is generated. At PCB=0x208, a load instruction writes register r8 using r7 as an address register. A DATA REG packet records the value read from memory followed by a DATA ADDR packet that records the memory address. At PCB=0x20c, a load instruction writes register r9 using r5 as an address register. Since the value of r5 is known to the decoder, only a DATA REG packet is generated. At PCB=0x210, a store instruction writes register r11 using r10 as an address register. Both register values are unknown to the decoder so a DATA REG and DATA ADDR packet are generated. At PCB=0x214, a store instruction writes register r5 using r12 as an address register. Since the value of r5 is known to the decoder, only a DATA ADDR packet is generated. At PCB=0x218, a store instruction write register r6 using r11 as an address register. Both register values are known to the decoder. No packets are generated and the pipeline status is set to SEQ. At PCB=0x21c, an indirect jump is made to the address in r13. Since the decoder does not know the value of r13, an IJMP packet is generated (same as instruction tracing). At PCB=0x300, an indirect jump is made to the address in r12. Since the decoder knows the value of r12, no packet is generated. The pipeline status is set to SEQ.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for compressing trace data, comprising:
maintaining a record of register values known to a debugger unit on a register map, wherein the register map is maintained by an electronic system under test;
monitoring instructions executed by the electronic system under test;
updating the register map in response to the instructions executed by the electronic system under test; and automatically generating a data packet that includes a value that is unknown to the debugger unit in response to determining from the register map that the debugger unit has insufficient information to determine the value, wherein the data packet is generated by the electronic system under test and wherein the debugger unit resides externally to the electronic system.

2. The method of claim 1, wherein maintaining the record of register values comprises:

monitoring instruction execution of a processor; and updating a register map in response to register write instructions.

3. The method of claim 2, wherein the register map comprises an n bit register that corresponds to n registers associated with the processor.

4. The method of claim 1, wherein the value corresponds to an address.

5. The method of claim 1, wherein the value corresponds to data.

6. The method of claim 1, wherein the packet is generated in response to a load instruction.

7. The method of claim 1, wherein the packet is generated in response to a store instruction.

8. The method of claim 1, further comprising updating the record of register values known to the debugging unit in response to the packet.

9. The method of claim 1, further comprising resetting the record of register values upon initialization of a processor.

10. The method of claim 1, further comprising resetting the record of register values in response to a gap in an instruction trace.

11. A trace compression unit, comprising:

a register map operable to maintain a record of register values known to a debugger unit, wherein the register map is maintained by an electronic system under test;

a register map manager to monitor instructions executed by the electronic system under test and to update the register map in response to the instructions executed by the electronic system under test; and a data packet generation unit operable to automatically generate a data packet with a value that is unknown to the debugger unit in response to determining from the register map that the debugger unit has insufficient information to determine the value, wherein the register map and data packet generation unit reside on an electronic system under test external to the debugger unit.

12. The apparatus of claim 11, further comprising a register map manager to update the register map in response to register write instructions.

13. The apparatus of claim 12, wherein the register map manager updates the register map in response to a generation of the data packet.

14. The apparatus of claim 11, wherein the register map comprises an m bit register and a processor with n registers where m is less than or equal to n and n minus m is the number of processor registers with fixed values.

15. The apparatus of claim 11, wherein the value corresponds to an address.

16. The apparatus of claim 11, wherein the value corresponds to data.

17. The apparatus of claim 11, wherein the packet is generated in response to a load instruction.

18. The apparatus of claim 11, wherein the data packet is generated in response to a store instruction.

19. The apparatus of claim 12, wherein the register map manager resets the record of register values upon initialization of a processor.

20. The apparatus of claim 12, wherein the register map manager resets the record of register values in response to a gap in an instruction trace.

21. A non-transitory machine-readable storage medium having stored thereon sequences of instructions, the sequences of instructions, when executed by a processor, causes the processor to perform a method comprising:

maintaining a record of register values known to a debugger unit on a register map, wherein the register map is maintained by an electronic system under test; and monitoring instructions executed by the electronic system under test;

updating the register map in response to the instructions executed by the electronic system under test; and automatically generating a data packet that includes a value that is unknown to the debugger unit in response to determining from the register map that the debugger unit has insufficient information to determine the value, wherein the data packet is generated by the electronic system under test and wherein the debugger unit resides externally to the electronic system.

22. The method of claim 1, further comprising:

receiving trace data; and resetting the record of register values in response to a gap in the trace data.

23. The method of claim 1, wherein maintaining the record of register values is performed by a trace compression unit separate from the debugger unit.

24. The method of claim 23, wherein the trace compression unit transmits trace data to the debugger unit.

25. The method of claim 1, wherein generating the data packet is performed by a trace compression unit separate from the debugger unit.

26. The method of claim 1, wherein generating the data packet is performed by a trace compression unit separate from the debugger unit and a processor generating trace data.

27. The method of claim 1 further comprising transmitting the data packet from the electronic system to the debugger unit.

* * * * *